(12) United States Patent
Martinelli

(10) Patent No.: US 8,860,385 B2
(45) Date of Patent: Oct. 14, 2014

(54) VOLTAGE CONTROLLED CURRENT SOURCE FOR VOLTAGE REGULATION

(75) Inventor: Robert Matthew Martinelli, Murrieta, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/017,046

(22) Filed: Jan. 30, 2011

(65) Prior Publication Data

US 2012/0194152 A1 Aug. 2, 2012

(51) Int. Cl.
*H02M 3/158* (2006.01)

(52) U.S. Cl.
CPC .................... *H02M 3/158* (2013.01)
USPC ............. 323/223; 363/127; 323/271

(58) Field of Classification Search
USPC ......... 323/222, 223, 224, 225, 282, 205, 207, 323/285, 284, 271, 351; 363/89, 127
See application file for complete search history.

(56) References Cited

U.S. PATENT DOCUMENTS

| 4,691,159 | A | | 9/1987 | Ahrens et al. | |
|---|---|---|---|---|---|
| 5,504,418 | A | | 4/1996 | Ashley | |
| 5,691,627 | A | * | 11/1997 | Shum | 323/222 |
| 5,789,723 | A | * | 8/1998 | Hirst | 219/501 |
| 6,657,419 | B2 | * | 12/2003 | Renyolds | 323/285 |
| 8,098,055 | B2 | * | 1/2012 | Avrutsky et al. | 323/222 |
| 8,138,740 | B2 | * | 3/2012 | Yuan | 323/288 |
| 8,476,882 | B2 | * | 7/2013 | Luo et al. | 323/282 |
| 2009/0039711 | A1 | * | 2/2009 | Williams | 307/113 |
| 2010/0045247 | A1 | * | 2/2010 | Blanken et al. | 323/273 |
| 2010/0308747 | A1 | * | 12/2010 | Tan et al. | 315/307 |
| 2011/0316491 | A1 | * | 12/2011 | Saint-Pierre | 323/205 |

* cited by examiner

*Primary Examiner* — Harry Behm
*Assistant Examiner* — Matthew Grubb
(74) *Attorney, Agent, or Firm* — Ameh IP; Lowell Campbell; Elahe Toosi

(57) ABSTRACT

A system and method for providing a voltage controlled current source for bus regulation is disclosed. A bus current delivered to an electrical bus from a current source is controlled using a synchronous switch according to a PWM duty cycle. Further, the PWM duty cycle is controlled to be proportional to an error signal based on a comparison of a voltage of the electrical bus to a reference voltage.

20 Claims, 4 Drawing Sheets

VOLTAGE CONTROLLED CURRENT SOURCE FOR VOLTAGE REGULATION

FIELD

Embodiments of the present disclosure relate generally to voltage controlled current sources. More particularly, embodiments of the present disclosure relate to voltage controlled current sources for voltage regulation.

BACKGROUND

Basic bus stabilization methods used in previous spacecraft designs may comprise a system with three basic units that are each individually stabilized with staggered set-points. The staggered set-points may transition from mode to mode as a central amplifier varies across a full operating range. Gaps between operating modes may result in bus transients that can create a large low frequency ripple on a bus when subjected to continuous load transients. The bus impedance may be very high as a control transitions from mode to mode of the central amplifier. Also in some cases, there is a limited amplitude oscillation that persists on the bus until a capability of a current source such as a solar panel increases or a load changes.

SUMMARY

A system and method for providing a voltage controlled current source for bus regulation is disclosed. A bus current delivered to an electrical bus from a current source is controlled using a synchronous switch according to a pulse width modulation (PWM) duty cycle. Further, the PWM duty cycle is controlled to be proportional to an error signal based on a comparison of a voltage of the electrical bus to a reference voltage.

The voltage controlled current source provides a bus regulator system which is much easier to stabilize and responds more rapidly to load transients than previous designs, while preventing occurrence of discernable change between various operating modes.

In an embodiment, an inductor is operable to couple to a current source. Additionally, a synchronous switch is coupled to the inductor and is operable to couple the inductor to an electrical bus according to a first pulse width modulation (PWM) duty cycle to deliver a bus current to the electrical bus. Further, a PWM controller is coupled to the synchronous switch and is operable to control the first PWM duty cycle such that the bus current is proportional to a source current from the current source and the first PWM duty cycle.

In another embodiment, a method for voltage controlled current source bus regulation controls a bus current delivered to an electrical bus from a current source using a synchronous switch according to a first PWM duty cycle. The method further controls the first PWM duty cycle to be proportional to an error signal based on a comparison of the electrical bus to a reference voltage.

In yet another embodiment, a method for operating a voltage controlled current source bus regulator receives a charge current, and controls flow of the charge current through an inductor according to a second PWM duty cycle using a ground-side switch coupled to the inductor and a ground. The method further controls flow of an inductor current from the inductor according to a first PWM duty cycle proportional to a feedback control signal using a synchronous switch coupled to the inductor and the ground-side switch.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
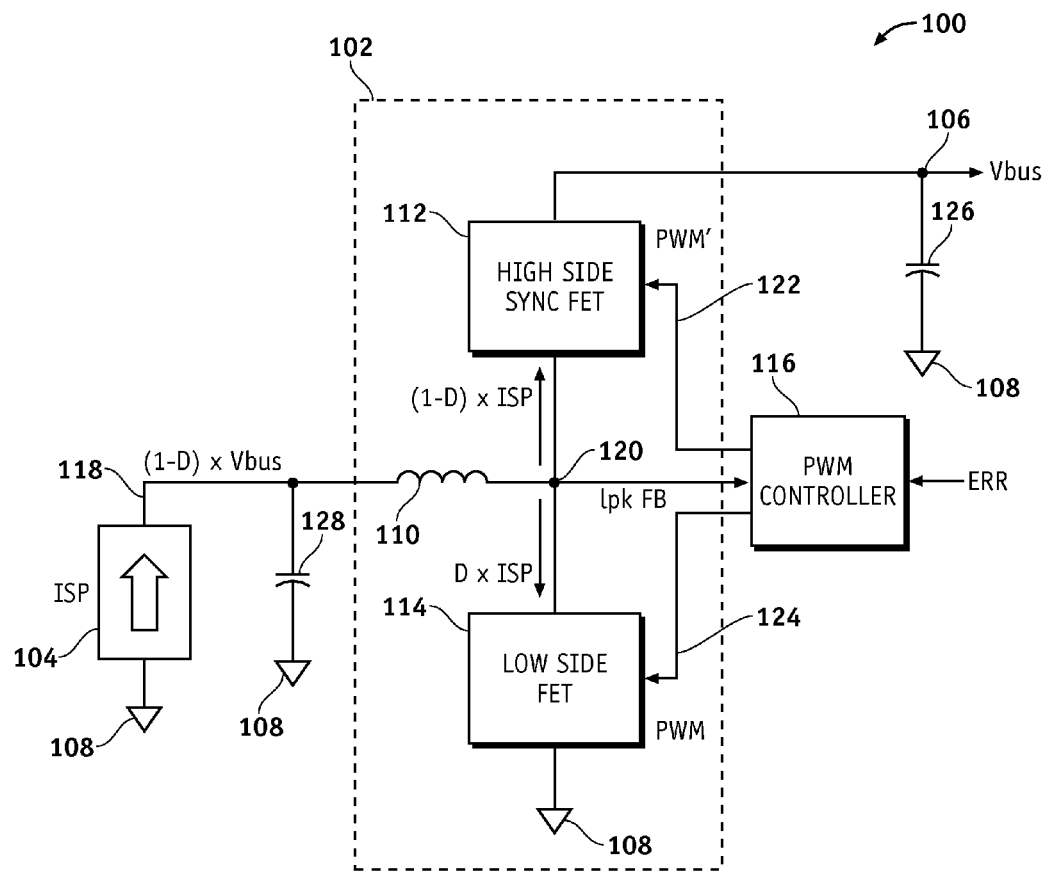
FIG. 1 is an illustration of an exemplary voltage controlled current source bus regulator according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to circuit design, control systems analysis techniques, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, voltage regulation on a manned and unmanned spacecraft electrical bus. Embodiments of the disclosure, however, are not limited to such space spacecraft applications, and the techniques described herein may also be utilized in other applications. For example but without limitation, embodiments may be applicable to manned and unmanned aircraft, ships, automobiles, buildings, trains, submarines, various voltage conversion applications and circuits, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Previous generations of solar panel regulators used a local feedback loop for each solar panel regulator with a slightly different set-point for a converter in each solar panel regulator. Since a local feedback loop has voltage feedback and a bus is generally a large capacitor while a power stage has an inductor, the local feedback loop has generally been a 2nd order system comprising a 2nd order transfer function. When an integrating error amplifier is added to a 2nd order system, a large stability margin is hard to achieve without sacrificing bandwidth. Additionally, a converter can operate in either continuous or discontinuous conduction mode. This adds complexity to the local feedback loop since the 2nd order transfer function in discontinuous mode represents a 1st order low bandwidth system, while in continuous conduction, the 2nd order transfer function represents a 2nd order system. Generally, this combination results in a design that at best can achieve about 1 kHz bandwidth with about 100 kHz switching frequency.

A new approach for designing a regulator according to various embodiments of this disclosure comprises a feedback port that controls a current delivered from a current source to an electrical bus so that the bus current is linearly proportional to an error signal (voltage error signal). This current source feeding a capacitance of the electrical bus is generally a 1st order system represented by a 1st order transfer function. When an integrating error amplifier is added to this 1st order transfer function, a simple zero is added to a numerator of an amplifier transfer function making the 1st order system stable. Some of advantages of the new approach are as follows:

(1) A transfer function of the regulator is a voltage controlled current source rather than a voltage controlled voltage source. This implies that an order of the transfer function of the regulator (e.g., local solar panel regulator) is reduced from a 2nd order transfer function to a 1st order transfer function. Therefore, it is much easier to stabilize a control loop of an electrical bus (e.g., a spacecraft power bus). Further, if a transfer function of a bi-directional converter (BDC) used to regulate the electrical bus during discharge also has a same voltage to current transfer function, no discernable change may occur when a central amplifier switches between various operating modes.

(2) Since a regulator only operates in continuous conduction mode, the transfer function of the regulator does not change with load current. Therefore using embodiments of this disclosure, it is much easier to develop an error amplifier with a bandwidth on an order of 3 kHz so that a transient response will be faster and a stability margin will be improved.

(3) Modules inherently share current. This is a necessary characteristic when PWM controllers (e.g., 100 kHz PWM modules) are combined with low frequency power switches that are controlled by a central amplifier. For embodiments described herein, it is possible to know when to switch power modules (e.g., a bank of current sources) and then reset an error signal to the PWM controllers by a correct amount to adjust for a power current transient that may be introduced to an electrical bus by the low frequency power switches.

Embodiments of the disclosure provide a bus regulator system where various converters can be designed in such a way that a basic control transfer function of the bus regulator system is a voltage controlled current source. For example but without limitation, at least three different bus regulation modes that may be considered are: A) operating from a solar panel or other power sources where excess current is shunted to ground; B) operating from a solar panel or other power sources where excess current is shunted to a battery or other loads; and C) operating from a battery or other loads where the solar panel or other power sources current is insufficient to the support a load current.

If control circuits are designed according to embodiments of the disclosure such that a basic transfer function of the control circuits comprises a voltage-to-current converter and a bus impedance is primarily capacitive, then a feedback system may be designed that is stable and well behaved as loads (e.g., spacecraft loads) transition from each of the bus regulation modes described above. Specifically, embodiments of the disclosure provide a voltage to current transfer function from a solar panel regulator or other power sources for the bus regulation mode case (A) above where excess current is shunted to ground.

Embodiments of the disclosure comprise a new PWM controller design that is substantially stable and responds rapidly to load transients. Embodiments also accommodate a central amplifier approach, where an error amplifier output is compared to a series of voltage thresholds such that power switches can be turned on to supply additional current to an electrical bus. An error signal to PWM switches/controllers is adjusted quickly so that a sum of an array of power sources connected to the electrical bus by power switches and current delivered to the electrical bus by PWM controlled switches is substantially equal to a load current.

FIG. 1 is an illustration of an exemplary voltage controlled current source bus regulator system 100 (system 100) according to an embodiment of the disclosure. The system 100 comprises a boost converter 102, a PWM controller 116, a current source 104 (comprising a current ISP), a source side capacitance 128, and an electrical bus 106.

The boost converter 102 comprises an inductor 110, a synchronous switch 112 (high side synchronous rectifier/FET), and a ground-side switch 114 (low side FET). The boost converter 102 may be used to regulate, for example but without limitation, a spacecraft power bus, a boost side capacitor, a satellite power bus, a ship electrical bus, an automobile electrical bus, a power grid electrical bus, a battery bus, and the like. The boost converter 102 may be coupled to the current source 104. Furthermore, the boost converter 102 may be coupled to the electrical bus 106, and boost a voltage on the electrical bus 106 higher than a voltage on the current source 104.

The ground-side switch 114 is coupled to the inductor 110, and couples the inductor 110 to ground 108 according to a PWM duty cycle controlled by the PWM controller 116 as explained in more detail below in the context of discussion of FIG. 2. The ground-side switch 114 may comprise, for example but without limitation, a field effect transistor (FET), a force commutated synchronous rectifier, and the like. When the ground-side switch 114 is on, a current D×ISP flows through the inductor 110 to the ground 108.

The synchronous switch 112 is coupled to the inductor 110, and couples the inductor 110 to the electrical bus 106 according to a PWM duty cycle to deliver a bus current to the electrical bus 106 as explained in more detail below in the context of discussion of FIG. 2. The synchronous switch 112 may comprise, for example but without limitation, a synchronous rectifier switch, a bi-directional synchronous rectifier switch, a force commutated synchronous rectifier, a field effect transistor (FET), and the like. When the synchronous switch 112 is on, a current (1−D)×ISP flows to the electrical bus 106.

The PWM controller 116 is coupled to the synchronous switch 112, and controls the PWM duty cycle such that the bus current is proportional to a source current from the current source 104 and the PWM duty cycle. In this manner, the PWM controller 116 produces a first PWM duty cycle signal 122 (PWM') to drive the synchronous switch 112 and a second PWM duty cycle signal 124 (PWM) to drive the ground-side switch 114. The first PWM duty cycle signal 122 (PWM') comprises a first PWM duty cycle, and the second PWM duty cycle signal 124 (PWM) comprises a second PWM duty cycle. In the embodiment shown in FIG. 1, the second PWM duty cycle is an inverse of the first PWM duty cycle, and the first PWM duty cycle is an inverse of the second PWM duty cycle. When the PWM controller 116 operates at a duty cycle D, on average, the current D×ISP is shunted to a ground 108 through the ground-side switch 114 and the current (1−D)× ISP is passed to the electrical bus 106. The PWM controller 116 is explained in more detail in the context of discussion of FIG. 2 below.

The source side capacitance 128 is coupled to the inductor 110, and may comprise, for example but without limitation, a ripple capacitor, a capacitor operable to reduce ripple on the current source 104, and the like. Generally, the source side capacitance 128 may be placed across the current source 104 (e.g., a solar array) to reduce a ripple voltage on the current source 104. However, the source side capacitance 128 and the inductor 110 in the boost converter 102 may create an LC filter that may tend to ring when a low frequency load transient occurs if the LC filter is not damped.

Various embodiments can be used to damp the LC filter. For example, in one embodiment the LC filter is over-damped and may therefore not ring. However, a damping capacitor of an over-damped LC filter would be quite large since the damping capacitor must be approximately 3× larger than a high frequency bypass capacitor and the damping capacitor must be rated for a full bus voltage. In another embodiment, a current mode control is used to damp the LC filter using a peak current feedback loop (e.g., using a peak current feedback signal 222 (Ipk FB)) as discussed in more detail below in the context of discussion of FIG. 2. Yet another embodiment comprises damping the LC filter using an RC circuit coupled in parallel with the source side capacitance 128 as discussed in more detail below in the context of discussion of FIG. 2.

The current source 104 may comprise, a power source, such as but without limitation, a battery, a solar array, a fuel cell, satellite and spacecraft aircraft power sources, shipboard generators, train power sources, submarine power sources, solar and engine powered long-duration aircraft and spacecraft (manned and unmanned) power sources, a super-heated thermal couple from a reactor, and the like.

The electrical bus 106 may comprise, for example but without limitation, a boost side capacitor, a satellite power bus, a ship electrical bus, an automobile electrical bus, a power grid electrical bus, a battery bus, and the like. The electrical bus 106 may also comprise an additional output capacitor 126 or LC filter (not shown) to reduce a switching frequency ripple to an acceptable level.

Figure 2:
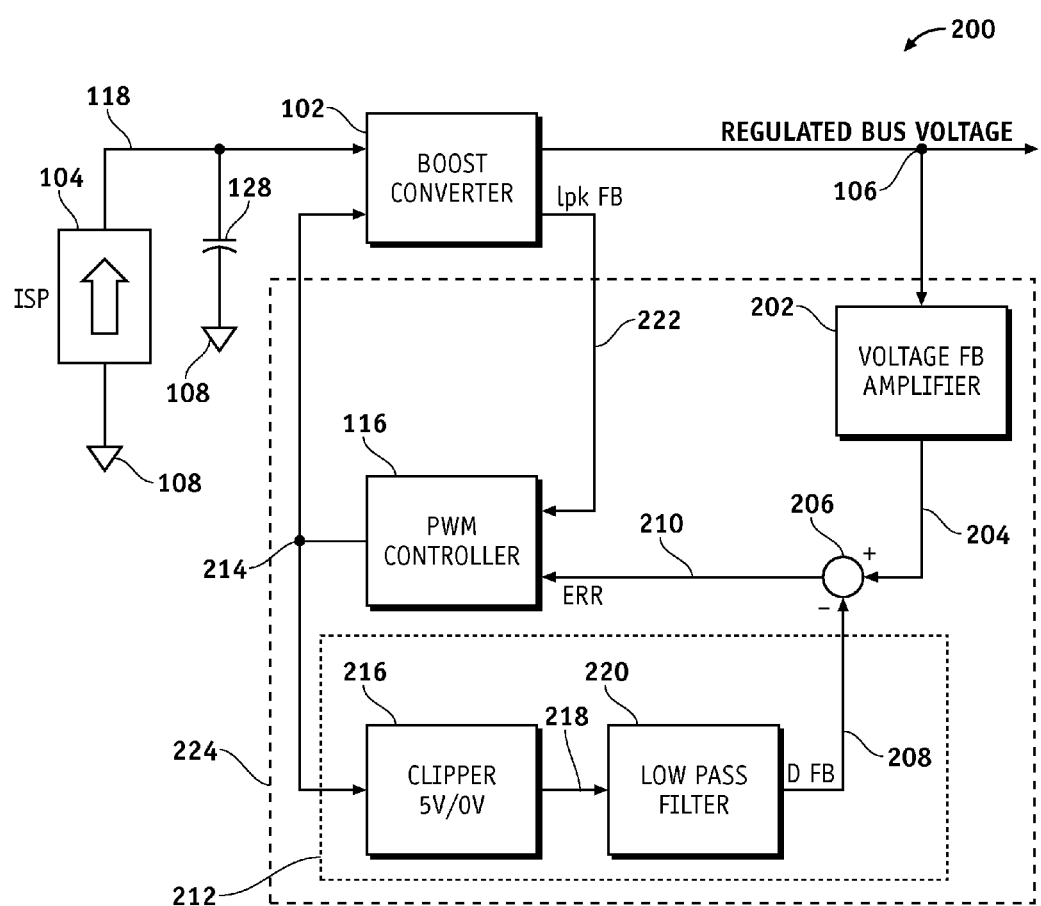
FIG. 2 is an illustration of an exemplary voltage controlled current source bus regulation system according to an embodiment of the disclosure.

FIG. 2 is an illustration of an exemplary voltage controlled current source bus regulation system 200 (system 200) according to an embodiment of the disclosure. The system 200 comprises the boost converter 102 (FIG. 1), and a feedback control loop 224. The feedback control loop 224 comprises a voltage feedback amplifier 202, the PWM controller 116 (FIG. 1), and an inner feedback loop 212.

The boost converter 102 damps and/or stabilizes an LC filter that may be created by the inductor 110 (FIG. 1) of the boost converter 102 and the source side capacitance 128. The boost converter 102 may comprise the peak current feedback signal 222 (Ipk FB).

The voltage feedback amplifier 202 samples a voltage of the electrical bus 106 to create a voltage feedback signal 204 based on the voltage of the electrical bus 106. A duty cycle feedback signal 208 comprising a reference voltage is subtracted from the voltage feedback signal 204 by a difference circuit 206 to provide an error signal 210 (ERR in FIG. 1).

The PWM controller 116 receives the peak current feedback signal 222 (from the boost converter 102) and the error signal 210 (ERR in FIG. 1) described above. The PWM controller 116 then generates a feedback control signal 214 comprising the first PWM duty cycle signal 122 (FIG. 1) and the second PWM duty cycle signal 124 (FIG. 1). The feedback control signal 214 controls the boost converter 102 which in turn controls the bus current delivered to the electrical bus 106 (FIG. 1). Thereby, a PWM duty cycle of the feedback control signal 214 is proportional to the peak current feedback signal 222, and the bus current delivered to the electrical bus 106 is proportional to the error signal 210 (voltage error signal/ERR). As mentioned above, the error signal 210 (ERR) is based on a comparison (e.g. subtraction) of the voltage feedback signal 204 comprising the voltage of the electrical bus 106 to the duty cycle feedback signal 208 comprising the reference voltage. In an embodiment, the PWM controller 116 may produce an analog feedback control signal (not shown) and PWM modulate the analog feedback control signal to produce the feedback control signal 214 proportional to the analog feedback control signal.

The inner feedback loop 212 comprises a clipper 216 and a low pass filter 220. The inner feedback loop 212 averages a PWM duty cycle (e.g., the first PWM duty cycle signal 122 and/or the second PWM duty cycle signal 124) of the feedback control signal 214. The clipper 216 receives the feedback control signal 214 and produces a waveform (e.g., a 0 to 5V peak rectangular waveform) that on average is proportional to the PWM duty cycle of the feedback control signal 214 and creates a clipped signal 218. The low pass filter 220 receives the clipped signal 218, and creates a duty cycle feedback signal 208 (D FB) proportional to the duty cycle of the feedback control signal 214. The low pass filter 220 functions to average the feedback control signal 214, thereby the duty cycle feedback signal 208 comprises a reference voltage based on an average voltage of the PWM duty cycle of the feedback control signal 214.

If the current source 104 comprises a constant current source (e.g., a solar panel), the feedback control loop 224 can deliver a current proportional to (1−D) to the electrical bus 106. A gain of the feedback control loop 224 would vary in proportion to an amplitude of a current of the current source 104. Thus, the voltage controlled current source bus regulation system 200 functions as a voltage controlled current source.

The voltage controlled current source bus regulation system 200 (PWM error amplifier) forces the error signal 210 (i.e., voltage feedback signal 204 minus the duty cycle feedback signal 208) to about 0V. Since (1−D) is proportional to current delivered to the electrical bus 106, the error signal 210 is proportional to the current delivered to the electrical bus 106. The feedback control loop 224 used to stabilize the LC filter does not have to be current mode control. Other methods for stabilizing the LC filter may comprise, for example but without limitation, an AC current feedback of the input capacitor current, integrated inductor voltage, direct inductor current measurement, and the like.

In one embodiment, the LC filter is damped using an RC circuit (not shown) coupled in parallel with the source side capacitance 128. Generally, a damping capacitor of the RC circuit must be significantly larger than the source side capacitance 128 (LC filter capacitor) so that a resonant frequency of the LC filter plus the RC circuit has a significantly lower frequency. Therefore, a resistor of the RC circuit in series with the damping capacitor generally must be chosen to damp the LC filter at this significantly lower frequency.

Figure 3:
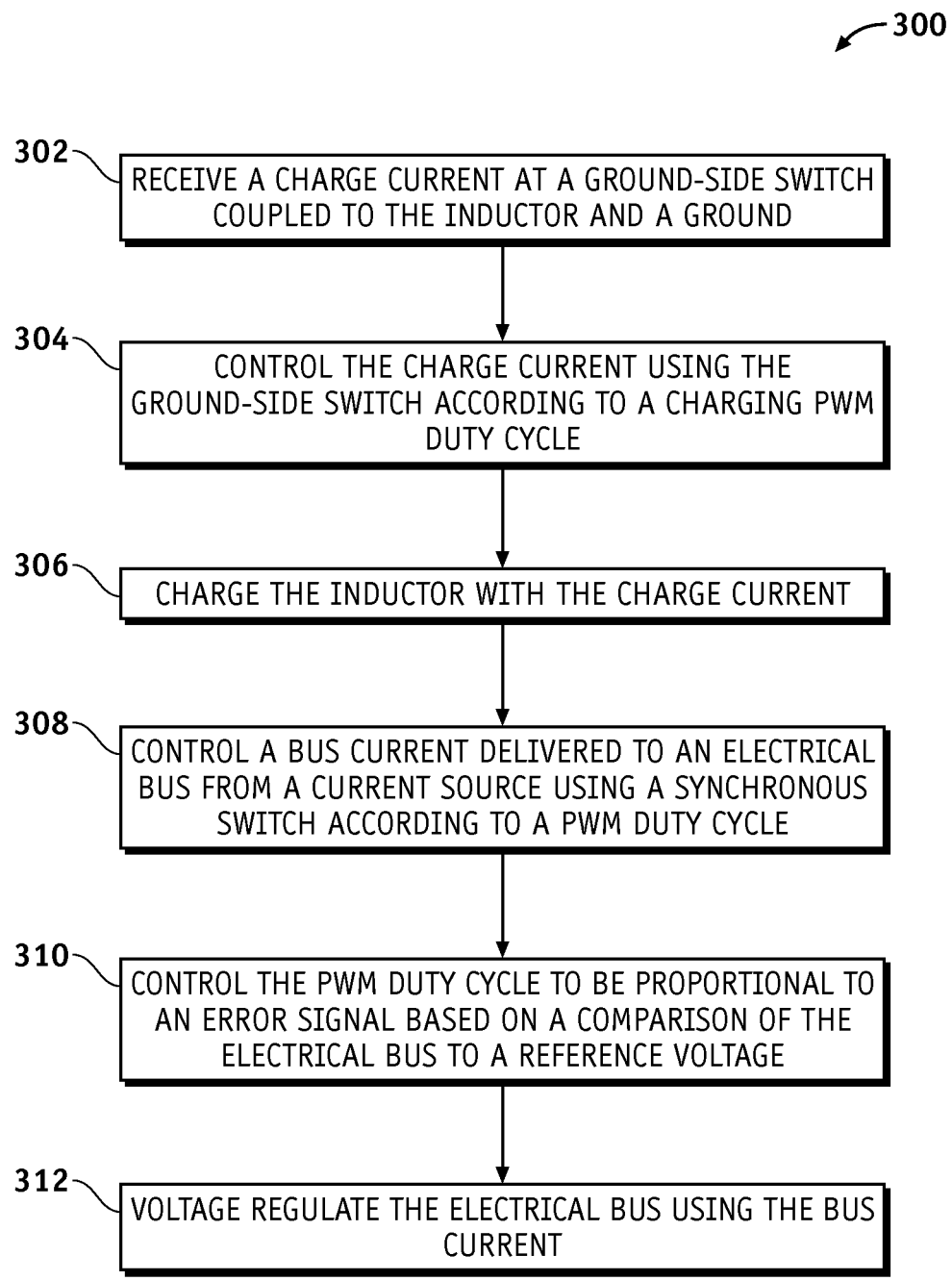
FIG. 3 is an illustration of an exemplary flowchart showing a voltage controlled current source bus regulation process according to an embodiment of the disclosure.

FIG. 3 is an illustration of an exemplary flowchart showing a voltage controlled current source bus regulation process 300 according to an embodiment of the disclosure. The various tasks performed in connection with process 300 may be performed mechanically, by software, hardware, firmware, or any combination thereof. It should be appreciated that process 300 may include any number of additional or alternative tasks, the tasks shown in FIG. 3 need not be performed in the illustrated order, and the process 300 may be incorporated into a more comprehensive procedure or process having additional functionality not described in detail herein.

For illustrative purposes, the following description of process 300 may refer to elements mentioned above in connection with FIGS. 1-2. In practical embodiments, portions of the process 300 may be performed by different elements of the systems 100-200 such as: the boost converter 102, the current source 104, the electrical bus 106, the voltage feedback amplifier 202, the PWM controller 116, the clipper 216, the low pass filter 220, etc. The process 300 may have functions, material, and structures that are similar to the embodiments shown in FIGS. 1-2. Therefore common features, functions, and elements may not be redundantly described here.

Process 300 may begin by receiving a charge current (D×ISP, see, e.g., FIG. 1) at the ground-side switch 114 coupled to the inductor 110 and the ground 108 (task 302).

Process 300 may continue by controlling the charge current (D×ISP, see, e.g., FIG. 1) using the ground-side switch 114 according to the second PWM duty cycle signal 124 (task 304). The second PWM duty cycle signal 124 comprises the second PWM duty cycle that functions as a charging PWM duty cycle for charging the inductor 110.

Process 300 may continue by charging the inductor 110 with the charge current (D×ISP, FIG. 1) (task 306).

Process 300 may continue by controlling a bus current ((1−D)×ISP, FIG. 1) delivered to the electrical bus 106 from the current source 104 using the synchronous switch 112 according to the first PWM duty cycle signal 122 (task 308). As mentioned above, the first PWM duty cycle signal 122 comprises the first PWM duty cycle.

Process 300 may continue by controlling the PWM duty cycle to be proportional to the error signal 210 based on a comparison of a voltage of the electrical bus 106 to the duty cycle feedback signal 208 comprising the reference voltage (task 310).

Process 300 may continue by voltage regulating the electrical bus 106 using the bus current ((1−D)×ISP, FIG. 1) (task 312).

Figure 4:
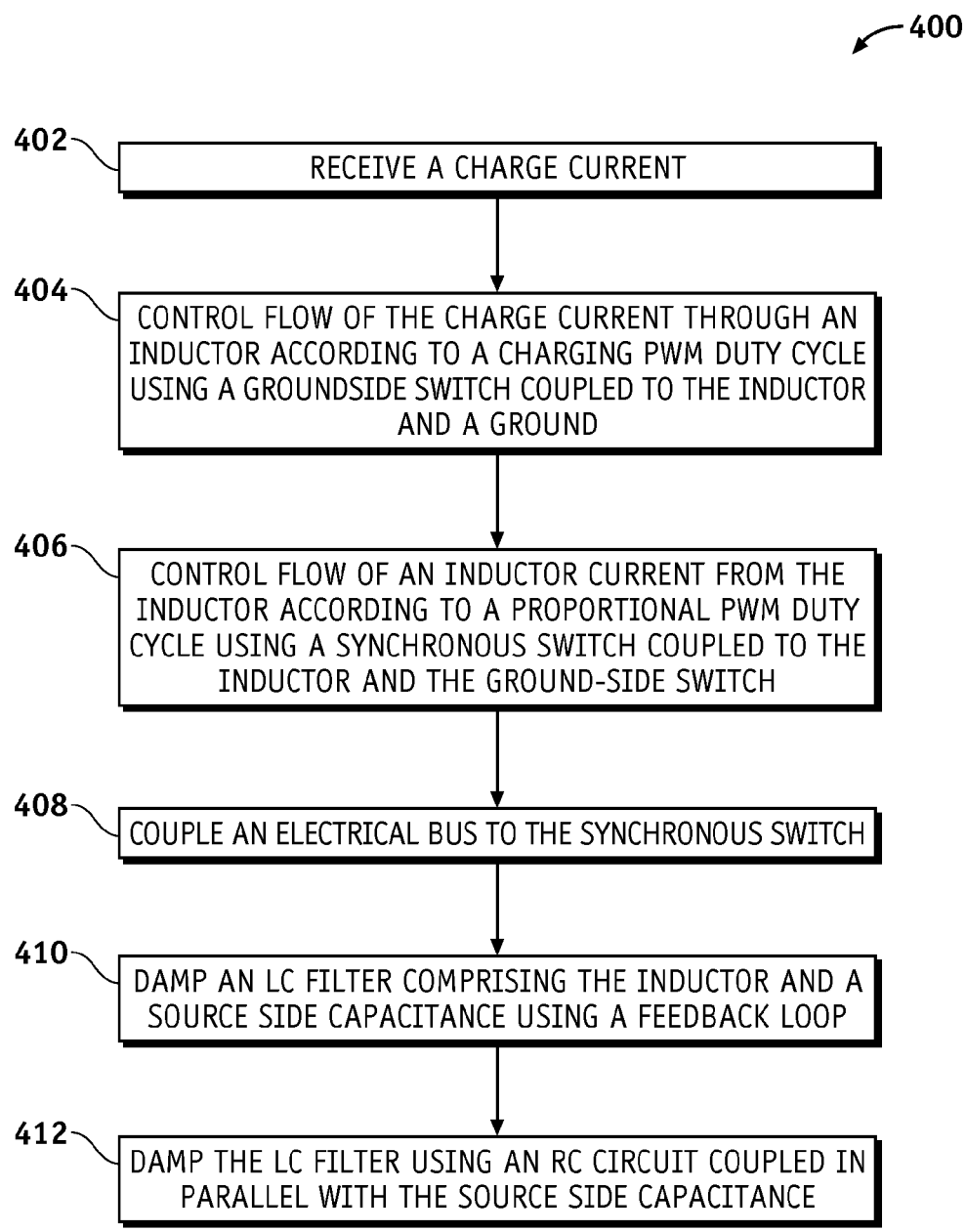
FIG. 4 is an illustration of an exemplary flowchart showing a voltage controlled current source bus regulator operating process according to an embodiment of the disclosure.

FIG. 4 is an illustration of an exemplary flowchart showing a voltage controlled current source bus regulator operating process 400 according to an embodiment of the disclosure. The various tasks performed in connection with process 400 may be performed mechanically, by software, hardware, firmware, or any combination thereof. It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein.

For illustrative purposes, the following description of process 400 may refer to elements mentioned above in connection with FIGS. 1-2. In practical embodiments, portions of the process 400 may be performed by different elements of the systems 100-200 such as: the boost converter 102, the current source 104, the electrical bus 106, the voltage feedback amplifier 202, the PWM controller 116, the clipper 216, the low pass filter 220, etc. The process 400 may have functions, material, and structures that are similar to the embodiments shown in FIGS. 1-2. Therefore common features, functions, and elements may not be redundantly described here.

Process 400 may begin by receiving the charge current (D×ISP, FIG. 1) (task 402).

Process 400 may continue by controlling flow of the charge current (D×ISP, FIG. 1) through the inductor 110 according to the second PWM duty cycle signal 124 using the ground-side switch 114 coupled to the inductor 110 and the ground 108 (task 404). As mentioned above, the second PWM duty cycle signal 124 comprises the second PWM duty cycle that is the charging PWM duty cycle for charging the inductor 110.

Process 400 may continue by controlling flow of the inductor current ((1×D)×ISP, FIG. 1) from the inductor 110 to the electrical bus 106 according to the first PWM duty cycle signal 122 using a synchronous switch such as the synchronous switch 112 coupled to the inductor 110 and the ground-side switch 114 (task 406). As mentioned above, the first PWM duty cycle signal 122 comprises the first PWM duty cycle that is proportional to the feedback control signal 214, and the PWM duty cycle of the feedback control signal 214 is proportional to the peak current feedback signal 222.

Process 400 may continue by coupling the electrical bus 106 to the synchronous switch 112 (task 408). A bus current into the electrical bus 106 is proportional to the error signal 210 based on a comparison (e.g., by the difference circuit 206) of the voltage feedback signal 204 of the electrical bus 106 to the duty cycle feedback signal 208 comprising the reference voltage.

Process 400 may continue by damping an LC filter comprising the inductor 110 and the source side capacitance 128 using the feedback control loop 224 (task 410).

Alternately, process 400 may continue by damping the LC filter using an RC circuit coupled in parallel with the source side capacitance 128 (task 412).

In this way, embodiments of the disclosure provide a voltage to current transfer function from a power source regulator where excess current is shunted to ground. In this manner, a voltage controlled current source provides a bus regulation system which is much easier to stabilize and responds more rapidly to load transients than previous designs, while preventing occurrence of discernable change between various operating modes when using a bank of current sources.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A voltage controlled current source for bus regulation comprising:
   an inductor operable to couple to a current source; and
   a synchronous rectifier switch coupled to the inductor at a node and operable to couple the inductor to an electrical bus according to a first pulse width modulation (PWM) duty cycle to deliver a bus current to the electrical bus; and
   a PWM controller coupled to the synchronous rectifier switch, and operable to produce and control the first PWM duty cycle such that the bus current is proportional to a source current from the current source and the first PWM duty cycle based on a peak current feedback signal from the node and on feedback of the first PWM duty cycle from the PWM controller to the PWM controller, the feedback comprising an error signal differencing a bus voltage of the electrical bus and a low pass filter output of a first duty cycle signal of the first PWM duty cycle directly from the PWM controller, and the low pass filter output comprising an average voltage of the first PWM duty cycle.

2. The voltage controlled current source for bus regulation according to claim 1, wherein the first PWM duty cycle is proportional to a feedback control signal from the PWM controller.

3. The voltage controlled current source for bus regulation according to claim 1, wherein the bus current is linearly proportional to an error signal based on a comparison of a voltage of the electrical bus to a reference voltage, the bus current is independent of the voltage of the electrical bus, and a transfer function of the voltage controlled current source does not change with a load current of the electrical bus.

4. The voltage controlled current source for bus regulation according to claim 3, wherein the reference voltage is based on an average voltage of a PWM duty cycle of a feedback control signal from the PWM controller.

5. The voltage controlled current source for bus regulation according to claim 1, wherein the synchronous rectifier switch comprises a force commutated synchronous rectifier.

6. The voltage controlled current source for bus regulation according to claim 1, wherein the electrical bus comprises at least one bus selected from the group consisting of: a spacecraft power bus, a satellite power bus, a ship electrical bus, an automobile electrical bus, and a power grid electrical bus.

7. The voltage controlled current source for bus regulation according to claim 1, further comprising a ground-side switch coupled to the inductor and operable to couple the inductor to a ground according to a second PWM duty cycle controlled by the PWM controller.

8. The voltage controlled current source for bus regulation according to claim 1, further comprising the current source coupled to the inductor.

9. The voltage controlled current source for bus regulation according to claim 8, wherein a voltage on the electrical bus is higher than a voltage on the current source.

10. The voltage controlled current source for bus regulation according to claim 8, wherein the current source comprises at least one power source selected from the group consisting of: a solar array, a battery, a fuel cell, and a generator.

11. The voltage controlled current source for bus regulation according to claim 1, further comprising a capacitor coupled to the inductor, wherein the capacitor is operable to reduce ripple on the current source coupled to the inductor.

12. A method for voltage controlled current source bus regulation, the method comprising:
   controlling a bus current delivered to an electrical bus from a current source using a synchronous rectifier switch according to a first PWM duty cycle; and
   controlling the first PWM duty cycle to be proportional to feedback of the first PWM duty cycle from a PWM controller to the PWM controller, and linearly proportional to an error signal based on a comparison of a voltage of the electrical bus to a reference voltage, the feedback comprising the error signal differencing the voltage of the electrical bus and a low pass filter output of a first duty cycle signal of the first PWM duty cycle directly from the PWM controller, and the low pass filter output comprising an average voltage of the first PWM duty cycle.

13. The method according to claim 12, wherein the synchronous rectifier switch comprises a force commutated synchronous rectifier.

14. The method according to claim 12, further comprising:
   receiving a charge current at a ground-side switch coupled to an inductor and a ground;
   controlling the charge current using the ground-side switch based on an inverse of the first PWM duty cycle; and
   charging the inductor with the charge current.

15. The method according to claim 12, further comprising voltage regulating the electrical bus using the bus current, so that the bus current is independent of the voltage of the electrical bus.

16. A method for operating a voltage controlled current source bus regulator, the method comprising:
   receiving a charge current;
   controlling flow of the charge current through an inductor according to a second PWM duty cycle using a ground-side switch coupled to the inductor and a ground; and
   controlling flow of an inductor current from the inductor according to a first PWM duty cycle proportional to a feedback control signal using a synchronous rectifier switch coupled to the inductor at a node and to the ground-side switch, the feedback control signal comprising the first PWM duty cycle based on a peak current feedback signal from the node and on feedback of the first PWM duty cycle from a PWM controller to the PWM controller, the feedback comprising an error signal differencing a bus voltage out of the inductor and a low pass filter output of a first duty cycle signal of the first PWM duty cycle directly from the PWM controller, and the low pass filter output comprising an average voltage of the first PWM duty cycle.

17. The method according to claim 16, further comprising coupling an electrical bus to the synchronous rectifier switch, and operating the voltage controlled current source bus regulator so that a transfer function of the voltage controlled current source bus regulator does not change with a load current of the electrical bus.

18. The method according to claim 17, wherein a bus current into the electrical bus comprising the inductor current from the inductor is linearly proportional to a voltage error signal, the voltage error signal based on a comparison of a voltage of the electrical bus to a reference voltage.

19. The method according to claim 16, further comprising damping an LC filter with an inner feedback loop, wherein the LC filter comprises the inductor and a source side capacitance.

20. The method according to claim 16, further comprising damping an LC filter comprising the inductor and a source side capacitance using an RC circuit coupled in parallel with the source side capacitance.

* * * * *